J. W. GRISWOLD.
GRATE FOR STOVES AND FURNACES.
No 73,800. Patented Jan. 28, 1868.
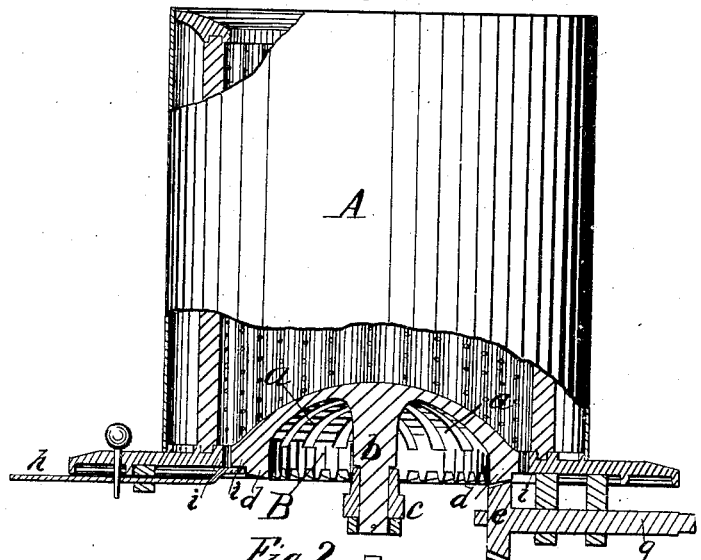
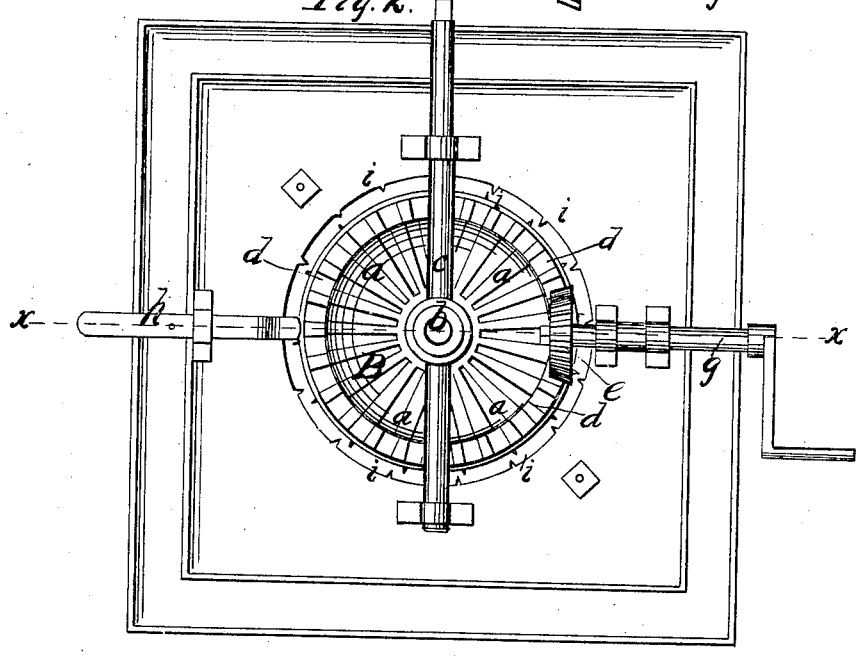
Witnesses.
H. C. Aslikettle
Theo Fusche
Inventor.
W. Griswold
per Munn & Co
attorneys.

United States Patent Office.

JOHN W. GRISWOLD, OF PHILADELPHIA, PENNSYLVANIA.

Letters Patent No. 73,800, dated January 28, 1868.

IMPROVEMENT IN GRATES FOR STOVES AND FURNACES.

The Schedule referred to in these Letters Patent and making part of the same.

TO ALL WHOM IT MAY CONCERN:

Be it known that I, JOHN W. GRISWOLD, of Philadelphia, in the county of Philadelphia, and State of Pennsylvania, have invented a new and useful Improvement in Grates for Stoves and Furnaces, &c.; and I do hereby declare that the following is a full, clear, and exact description thereof, which will enable those skilled in the art to make and use the same, reference being had to the accompanying drawings, forming part of this specification.

Figure 1 represents a partial vertical section of my improved rotary conical grate.
Figure 2 represents a bottom view.
Similar letters of reference indicate corresponding parts.

This invention relates to an improvement in the construction of grates to be used for stoves, heaters, furnaces for steam-boilers, or other purposes; and it consists in a conical grate set in the bottom of a cylindrical fire-chamber, in connection with gearing operated by a crank to rotate it, and having the convex side upward, so that, while the finer ashes shall fall through the grate, the larger pieces of cinder and slate will fall down around the side of the cone, where they are crushed and ground to powder, by the rotation of the grate, between teeth on the periphery of the conical grate at its base, and on the inside of the base of the cylinder around the grate, as hereinafter described.

A represents a cylindrical fire-chamber, in the bottom of which is the conical cast-iron grate B, having radial bars, $a\, a$, and its convex side upward. A central shaft, $b$, is cast on the concave side of the grate, and is pivoted on a cross-shaft, $c$, under the grate, by which shaft the grate may be upset, as usual, when necessary. On the under side of the rim of the conical grate are cogs, $d\, d$, that gear into a pinion, $e$, on a short crank-shaft, $g$, by which the grate is rotated. The pinion $e$ supports the grate on one side, and on the opposite side it is supported by a slide bar, $h$, which is drawn from under when the grate is to be upset. At the periphery of the grate, and the inside of the base of the cylinder, are teeth, $i\, i$, which catch and crush cinder and slate.

It will be seen that, with a grate thus constructed and arranged, the fine ashes will fall through the bars readily, while the larger pieces of slate, clinker, or cinder, will fall to the base of the conical grate, and be ground to powder, by the teeth around the periphery, when the grate is rotated.

Having thus described my invention, I claim as new, and desire to secure by Letters Patent—

The conical rotating grate B, in combination with the cylinder A, both provided with teeth $i\, i$ at the base, constructed, arranged, and operating substantially as and for the purpose herein described.

JNO. W. GRISWOLD.